Oct. 6, 1931.  C. S. BRAGG ET AL  1,826,418
BRAKE SYSTEM FOR AUTOMOTIVE VEHICLES
Filed Feb. 16, 1928  2 Sheets-Sheet 1
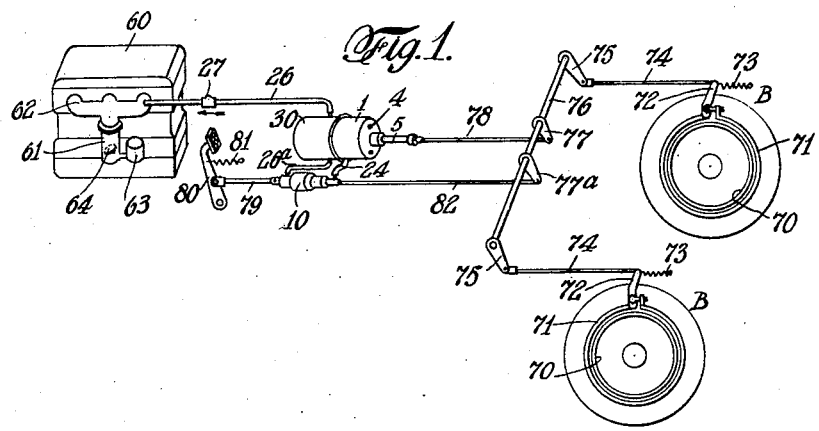
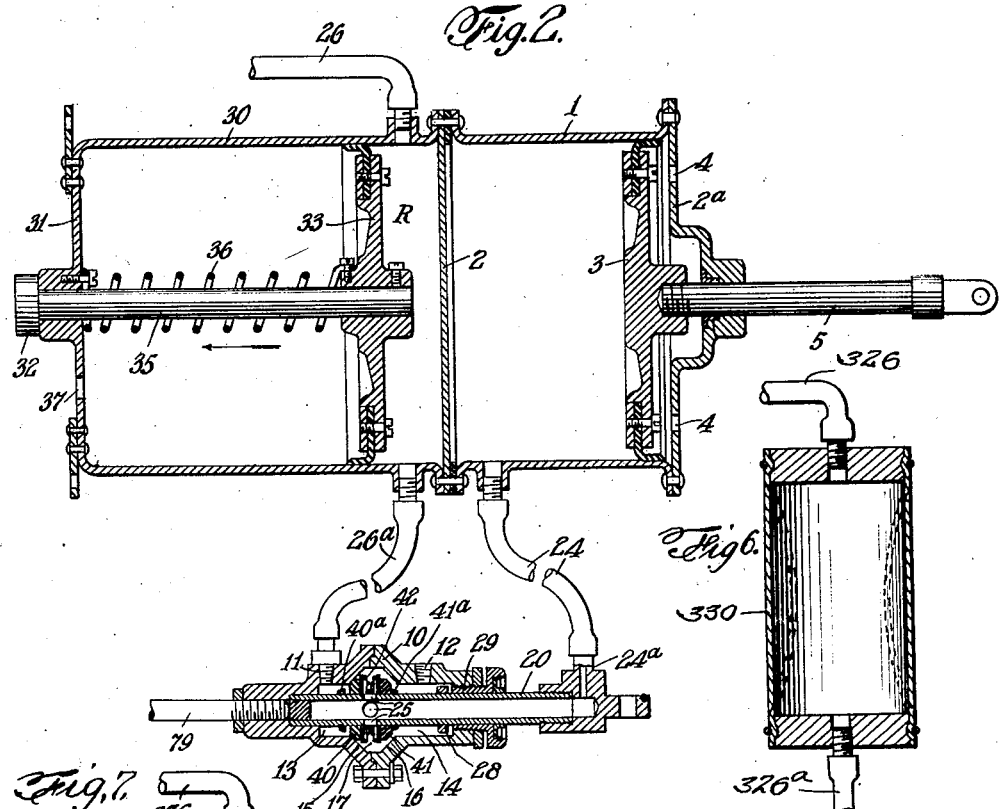
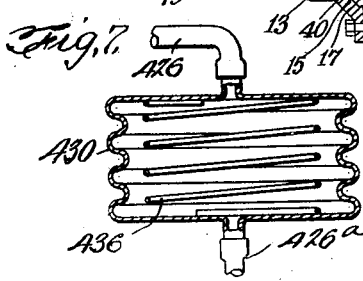

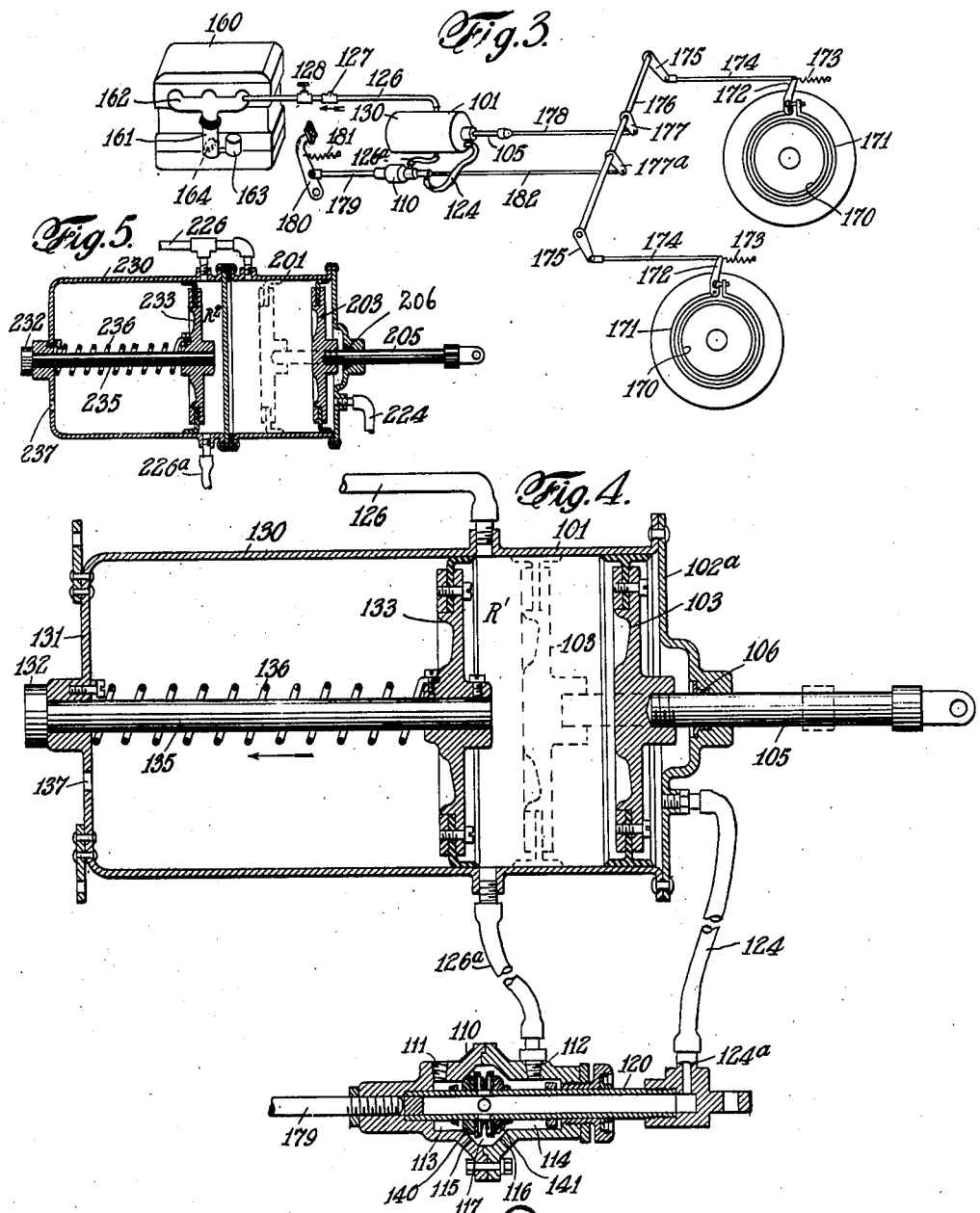

Patented Oct. 6, 1931

1,826,418

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE SYSTEM FOR AUTOMOTIVE VEHICLES

Application filed February 16, 1928. Serial No. 254,649.

Our invention consists in the novel features hereinafter described, reference being had to the accompanying drawings which illustrate several embodiments of the same, selected by us for purposes of illustration, and the said invention is fully disclosed in the following description and claims.

In the operation of suction actuated devices, especially in connection with vacuum brake systems in which the suction is obtained by a connection with the throttle controlled suction passage of an internal combustion engine between the throttle valve and the engine cylinders, it is easily possible to withdraw air or other higher pressure fluid from the suction actuated device in such large quantities at a time into the suction passage of the engine as to interfere with the operation of the engine or stall it if idling. The employment of throttling means for restricting the delivery of such air into the suction passage of the engine will necessarily retard the operation of the suction actuated device, unless means are taken to prevent it, and it has been proposed to insert a vacuum storage tank between the suction actuated device and the suction passage, in the belief that by this means, on the operation of the controlling valve mechanism, the air would be quickly withdrawn into the suction tank to effect a quick operation of the suction actuated device and could be more slowly delivered from the tank into the suction passage. As a result of extensive experimentation, we have ascertained that the air withdrawn from a suction actuated device through a tank in this manner tends to pass directly across the tank from the inlet to the outlet, and thence to the suction passage, and that unless the tank exceeded many times the capacity of the suction actuated device, it merely acts as a conduit of greater diameter, and has little effect beyond a reduction in surface friction, and the acceleration of the air to the connection between the tank and the suction passage, which acts of necessity as a restricting passage. In the operation of vacuum brake mechanism for automotive vehicles the use of a storage tank large enough to accomplish the desired end is almost prohibitive and the use of a smaller tank is ineffective.

As a result of considerable experimentation, we have discovered that the use of a variable volume vacuum tank or reservoir of relatively small size, provided with a yielding wall or walls, the outer surface of which is subjected to atmospheric pressure, and the inner surface of which is subjected to suction, is very effective. The tank is interposed between the throttle controlled portion of the suction passage of the engine and the valve mechanism for the suction actuated device, and a check valve opening towards said suction passage is preferably placed in the connection between the tank and said suction passage. Whenever the engine is running and the throttle valve closed or partially closed, the tank will be maintained yieldingly in its condition of minimum capacity, or what we may term a collapsed condition, and if then such a tank is connected with a portion of the suction actuated device from which air or other higher pressure fluid is to be exhausted, there will be an almost instantaneous equalization of pressures between the suction actuated device and the storage tank, with a minimum rise of pressure therein. This effects a quicker withdrawal of air from the suction actuated device with the result that a sufficient and almost instantaneous reduction of pressure in the suction actuated device is obtained to effect a quicker operation thereof, without discharging any very considerable portion of the air withdrawn into the suction passage of the engine and permitting this air into the suction passage in such quantities as would interfere with the operation of the engine or stall it while idling. We thus obtain the desired benefit of a storage tank to quickly withdraw the air from a suction actuated device and deliver it slowly into the suction passage of the engine. It is to be understood that the degree of vacuum is constant whenever the throttle valve is closed, and as the suction passage is at all times connected with the tank, all air that may be withdrawn with the degree of suction available is withdrawn from the reservoir each time the throttle is closed, and furthermore, that the closing of the throttle occurs more often than the application of the brakes. The check valve, therefore, normally maintains the reservoir in the maximum degree of rarification, with the yielding means normally stretched to the maximum and the reservoir contracted to its minimum capacity. As the reservoir is placed in communication with the portion of the suction actuated device to be evacuated, the air or other higher pressure fluid may be withdrawn therethrough into the suction passage without any appreciable rise of pressure in the tank, if the air is not delivered more rapidly than can be immediately withdrawn into the suction passage of the engine. When air is delivered more rapidly into the tank than can be immediately withdrawn into the suction passage and the pressure within the tank rises, the decrease in the differential of pressures within and without the reservoir permit the yielding means to contract and increase the size of the reservoir. This movement of the yielding wall and the accompanying increase in the capacity of the reservoir tends to maintain any air within the reservoir at a higher degree of rarification and more nearly equal to that in the suction passage, so that the higher pressure fluid or air withdrawn from the suction actuated device is retained within the expanding reservoir at greatly reduced pressure until it is withdrawn into the suction passage. We have found that by this means a much smaller reservoir, even in the expanded condition, will accomplish the desired result as well as a non-expansible reservoir of many times its size. The variable volume reservoir may be formed by employing a collapsible tube, or receptacle, formed of elastic material, but we find it convenient to employ a cylindrical reservoir provided with a movable wall in the form of a piston acted upon by a spring, and the reservoir may be separate from the cylinder of the suction actuated device, or formed as a part thereof, as preferred.

Referring to the accompanying drawings:

Fig. 1 represents, diagrammatically, an installation of a brake system in an automotive vehicle embodying our present invention, including a power actuator, the piston of which is maintained submerged in the higher fluid pressure when in released position, and having a variable volume vacuum reservoir separate from the actuator cylinder.

Fig. 2 is an enlarged sectional view of the power actuator, controlling valve mechanism and reservoir, shown in Fig. 1.

Fig 3 is a diagrammatic view similar to Fig. 1, showing a slightly modified construction in which the collapsible reservoir is formed integrally with the actuator and the piston of the power actuator is maintained submerged in vacuum when in released position.

Fig. 4 is an enlarged view of the power actuator, reservoir and valve mechanism, arranged as shown in Fig. 3.

Fig. 5 is a view similar to Fig. 4, showing another slight modification.

Figs. 6 and 7 are detail sectional views showing slight modifications of the collapsible vacuum reservoir.

In the embodiment of our invention illustrated in Figs. 1 and 2, 60 represents the internal combustion engine for propelling the automotive vehicle, which is provided with the usual throttle controlled suction passage comprising the vertical portion, 61, connecting the carburetor, 63, with the intake manifold, 62, the usual throttle valve, indicated at 64, being provided between the carburetor and the engine cylinder. Brake mechanisms for the vehicle are illustrated diagrammatically at B, B, and may be of any usual or desired construction. In the present instance each brake mechanism is shown as comprising a brake drum, 70, brake band, 71, brake applying lever, 72,—and retracting spring, 73, and the brake levers are in this instance connected by links, 74, with arms, 75, on a rock shaft, 76, which is provided with an actuating arm, 77, and a second actuating arm, 77a. The power actuator for applying the brakes by power comprises a cylinder, 1, closed at one end by head, 2, and provided at the other end in this instance with a head, $2^a$, having apertures, 4, therein, communicating at all times with the atmosphere. 3 represents the actuator piston provided with a piston rod, 5, extending through the head, $2^a$. The suction or vacuum reservoir is shown in this instance as being formed within a cylinder, 30, provided at its outer end with a perforated head, 31, and closed at its opposite end. In this instance we have shown the cylinder, 30, connected with the cylinder, 1, of the actuator, but separated therefrom by the head, 2, of the latter, which forms a partition between the actuator cylinder and the reservoir. The capacity of the cylinder, 30, is greater than that of the cylinder, 1. The cylinder, 30, is provided with a movable wall, in this instance in the form of a piston, 33, having its edges in sealing engagement with the cylinder, 30, and provided with a piston rod, 35, engaging a guiding aperture in the head, 31, and provided with a collar, 32, for limiting the inward movement of the piston, 33. The movable wall, or piston, 33, of the reservoir is normally subjected to the action of a contractile spring, 36, one end of which is secured to the head, 31, and the other to the piston, so as to normally draw the piston outwardly in the direction of the arrow, Fig. 2. The spring, 36, is so calibrated that it will exert a tension or pull on the piston, 33, approximately equal to the maximum differential of fluid pressures on said piston, exerted in the opposite direction without material variation throughout the maximum range of movement of the piston, 33. It will be understood that the maximum movement of the piston, 33, will be such as to provide an increase of capacity of the cylinder, 30, corresponding with the decrease in capacity of the portion of cylinder, 1, forward of the piston, 3, effected by the maximum stroke of the piston, 3, and it is desired to have the tension of the spring, 36, substantially uniform throughout the range of movement of the piston, 33. Of course, where the cylinders, 1 and 33, are of equal diameter, as shown in the drawings, the maximum range of movement of spring, 36, will be substantially the same as the maximum stroke of piston, 33. The head, 31, of the cylinder, 30, is provided with a breathing aperture, indicated at 37, so that the outer face of the piston, 33, is exposed to atmospheric pressure. The portion of the cylinder, 30, between the piston, 33, and the partition, 2, constitutes the variable volume reservoir, which is indicated at R, in Fig. 2, in which it is shown in substantially minimum volume position, or position of smallest capacity, the spring, 36, being under tension. The reservoir, R, is connected at all times with the suction passage of the engine between the throttle valve, 64, and the intake valves of the engine. In this instance it is shown connected by a pipe, 26, with the intake manifold, 62, and said pipe is preferably provided with a check valve, 27, opening in a direction toward the manifold, as indicated by the small arrow adjacent thereto, in Fig. 1. The power actuator is provided with suitable controlling valve mechanism, which in this instance is shown located exterior to the actuator cylinder, as shown in Fig. 2, and may be of any desired type. The specific construction of the valve mechanism shown is not claimed herein, as it forms the subject matter of another application for Letters Patent of the United States filed by us March 13, 1926, and given Serial No. 94,412. This valve mechanism will, therefore, only be described sufficiently to enable its operation to be understood. The controlling valve mechanism comprises in this instance a casing, 10, containing a central valve chamber, 17, having oppositely disposed valve seats, 15 and 16, adapted to be engaged by oppositely disposed valves, 40 and 41, the valve chamber and valves being located between end chambers, 13 and 14, in the casing, of which, 13, is a suction chamber and is connected by a flexible pipe, 26ª, with the suction passage of the engine and also with the collapsible reservoir, R. In this instance we have shown the pipe, 26ª, connected directly to the reservoir, R, and communicating therethrough with the suction pipe, 26. The chamber, 14, is the higher pressure chamber and communicates in this instance by an aperture, 12, with the atmosphere. The valves, 40 and 41, are preferably formed of molded cork, cork composition, rubber or other suitable material, and are provided with central apertures, which engage with a sealing fit a hollow valve actuating sleeve, 20. The valves are pressed yieldingly toward their seats by suitable means, as a spring, 42, and the valve sleeve 20 is provided with collars 40ª and 41ª, adapted to effect the opening of one valve after permitting the other to be closed by a movement in either direction, and to permit both valves to be closed simultaneously. The valve mechanism is operated by relative movement between the casing, 10, and the valve sleeve, 20. In this instance the valve casing is connected by a link rod, 79, with a foot lever, 80, or other operator operated part, provided with the usual retracting spring, 81, and the sleeve, 20, is connected by a link, 82, with the brake operating arm, 77ª. The extent of lost motion between the casing and the valve actuating sleeve is limited in one direction by a collar, 28, on the valve actuating sleeve, which engages an adjustable collar, 29, threaded in the rear end of the casing, 10, and is limited in the opposite direction by the engagement of the closed forward end of the sleeve, 20, with the end of a guiding recess in the valve casing. The valve actuating sleeve is provided with an aperture, or apertures, 25, communicating with the valve chamber, 17, and the outer end of the valve actuating sleeve is provided with a pipe fitting 24ª, which is connected by a flexible pipe, 24, with the actuator cylinder, 1, forward of the piston therein. When the valve mechanism is in released position as shown in Fig. 2, the casing, 10, will be in its rearward position with respect to the valve actuating sleeve, 20, and the suction valve, 40, will be closed, while the air inlet valve or higher fluid pressure valve, 41, will be held open, thereby connecting the actuator cylinder forward of the piston with the air inlet, 12. This subjects the forward face of the actuator piston, 3, to atmospheric pressure, and as its rear face is always exposed to atmospheric pressure, the piston is maintained submerged in atmospheric air when the valve mechanism is in the released position.

Assuming that the engine is running and the throttle valve, 64, is in closed or partly closed position, with the suction valve, 40, seated, a state of rarification or partial vacuum exists in the suction pipe, 26, in the reservoir, R, in the pipe, 26ª, and suction chamber, 13, of the valve mechanism, and the piston, 33, will be in its rearmost position in which it is shown in Fig. 2, the spring, 36, being expanded, under the atmospheric pressure on the outer face of the piston, 33, and under tension, which tension acts on the piston, 33, in the direction of the arrow, Fig. 2. The piston rod, 5, of the power actuator is shown connected by a link, 78, with the arm, 77, on the rock shaft, 76, connected with the brake mechanism, B, B, the piston being in its retracted position and the brake mechanisms in their released positions, in which they are held by the retracting springs, 73. If the operator desires to apply the brake mechanisms, he will place his foot on the foot lever, 80, and depress it, thereby shifting the valve casing, 10, forward, with respect to the valve actuating sleeve, 20, so as to open the suction valve, 40, after permitting the air inlet valve, 41, to close. This disconnects the actuator cylinder, 1, forward of the piston from the atmosphere and connects it with the reservoir, R, and with the suction passage of the engine. If the suction valve, 40, is fully opened, there will be a more rapid transfer of air from the cylinder, 1, to the reservoir, R, than can pass into the suction passage of the engine through the pipe, 26, and as the pressure in the reservoir rises, the spring, 36, will draw the piston, 33, in the direction of the arrow, Fig. 2, increasing the capacity of the reservoir and preventing a greater rise in the pressure within the reservoir than the tension of the spring, 36, will permit, thus effecting a very rapid evacuation of a large portion of the air within the actuator cylinder, 1, and accommodating it within the increased capacity of the reservoir, R, without the necessity of discharging such quantities of air immediately into the suction passage of the engine as might stall the engine if idling. Air in restricted quantities, which will not stall the engine, if idling, will immediately and subsequently be withdrawn from the reservoir and from the actuator into the suction passage, and if the suction valve, 40, is not too fully open, air may be withdrawn directly into the suction passage without expanding the tank. The reduction of pressure in the actuator cylinder, 1, forward of the piston, 3, may be so rapid that the piston, 3, of the actuator, will move rapidly forward in the direction of the arrow, Fig. 2, applying the brake mechanism (or effecting the operation of any other part with which the piston may be connected). Air will continue to be withdrawn from the actuator until the suction valve is closed, or until the maximum rarification has been produced and air will simultaneously be withdrawn from the reservoir, R, until the piston, 33, has moved back under the atmospheric pressure against the tension of the spring, 36, and decrease the capacity of the reservoir to the minimum determined by the stop, 32. This construction, therefore, effects a rapid evacuation of the actuator cylinder, 1, and a quick application of the brake mechanism followed by a more leisurely withdrawal of the air from the variable volume reservoir, R, thus avoiding delay in the application of the brake mechanism on the one hand, and danger of stalling the engine if idling, on the other. The operator may, by stopping the forward movement of the foot pedal lever, permit a slight continued movement of the piston, 3, and valve sleeve, 20, which is connected therewith through the piston rod link 78, arm 77, rock shaft 76, arm 77$^a$ and link 82 to close the suction valve, 40, without opening the air inlet valve, 41, and hold the brakes as applied, and the brake mechanism may be released and returned with the actuator piston to the off position by releasing the pressure on the foot pedal or removing the foot therefrom altogether to permit the retracting spring, 81, to open the air inlet valve, 41, after the suction valve, 40, is closed, permitting air to enter the actuator cylinder forward of the piston and equalize fluid pressures thereon, the brakes being returned to off position by the retracting springs, 73.

As the valve mechanism is connected in linkage between the foot lever and the brake mechanism, it moves with the piston, and the operator may, by taking up the lost motion between the valve casing and the valve actuating sleeve, apply his physical force to the brake mechanism through the link rod, 82, and arm, 77$^a$, in addition to that exerted by the actuator, and in like manner the operator may apply the brake mechanisms by physical force alone in case of failure of power, or when the engine is not running, one of the valves, 40, 41, being open to vent the cylinder when the piston is moved in either direction.

In Figs. 3 and 4 we have shown our invention embodied in connection with a power actuator in which the piston is normally submerged in vacuum when the valve mechanism is in the released position. In these figures the parts which correspond with those previously described and illustrated in Figs. 1 and 2 are given the same reference characters with the addition of 100 to avoid repetition. In this instance we have shown the reservoir cylinder formed integrally with the actuator cylinder as one cylinder, but for convenience of reference we have indicated the portion in which the actuator piston, 103, reciprocates, by the numeral 101, and the portion in which the piston, 133, reciprocates, as 130. The cylinder is closed at its rear end by the air tight head, 102$^a$, provided with a stuffing box, 106, the other end being provided with a head, 131, having the breathing aperture, or apertures, 137. In this instance the piston, 133, forms the other closed head of the actuator cylinder, the portion of the actuator cylinder forward of the piston, 103, constituting a vacuum tank, or reservoir, as well as a part of the actuator cylinder. The suction pipe, 126, is connected in this instance with the cylinder portion, 101, at a point just in rear of the innermost position, which can be assumed by the yielding piston, 133, and by the normal piston stroke of the actuator piston, so that the portion of the cylinder between the two pistons, at R', is at all times in communication with the suction passage. The controlling valve mechanism shown is exactly the same in construction as that previously described with reference to Fig. 2, but in this instance the valve, 141, is the suction valve, and the end chamber, 114, is connected with the actuator cylinder portion, 101, that is to say, the reservoir, R', by pipe, 126ª, which is connected to the aperture, 112, of the valve casing, and the hollow valve actuating sleeve is connected by pipe, 124, with the actuator cylinder in rear of the piston, 103. The chamber, 113, at the forward end of the valve casing, is connected by an aperture, 111, with the atmosphere.

In the released position of the valve mechanism illustrated in Fig. 4, the suction valve, 141, is held open, the valve casing 110, being in its rearmost position with respect to the valve actuating sleeve as shown, and the engine being in operation, the air will be exhausted from the actuator cylinder portion, or reservoir, R', forward of the piston, 103, and also in rear of the piston, 103, thus maintaining the piston, 103, submerged in vacuum when the parts are in the released position, and also maintaining the yielding piston, 133, in its rearmost position, as indicated in Fig. 4, with the spring, 136, under maximum tension, which will be exerted on the piston, 133, in the direction of the arrow, Fig. 4. When it is desired to apply the brakes, the operator will depress the pedal lever, thereby shifting the valve casing with respect to the valve actuating sleeve, so as to open the air inlet valve, 140, after closing the suction valve, 141, and admitting air to the cylinder in rear of the actuator piston, 103, through the pipe, 124, the hollow valve actuating sleeve, 120, and the air inlet, 111. This will effect a power stroke of the piston, 103, which will move forward into the position indicated in dotted lines in Fig. 4, and apply the brakes without admitting any appreciable quantity of air to the suction passage of the engine, as the reservoir portion, R', forward of the piston, 103, is already in condition of rarification. By relieving the foot lever so as to permit the air inlet valve, 140, to close, without opening the suction valve, 141, the brakes may be held as applied. To release the brake mechanisms the operator will release the foot lever, so as to permit the valve casing to be moved rearwardly with respect to the valve sleeve, sufficiently to open the suction valve, 141, thus connecting the portion of the cylinder in rear of the actuator piston, 103, with the portion, 101, of the cylinder forward of said piston, and between it and the yielding piston, 133. This will transfer a large portion of the air previously admitted to effect a power stroke of the actuator piston from the portion, 101, of the cylinder in rear of the piston to the reservoir, R', between the pistons, where the rise in pressure will permit the spring, 136, to retract the yielding piston, 133, and increase the size of the reservoir, as previously described with reference to Figs. 1 and 2, and accommodate the air transferred from the rear of the piston, 103. As the piston, 103, returns to its off position, the further evacuation of the reservoir, R', will again retract the yielding piston, 133, to the position indicated in Fig. 4.

This construction is particularly advantageous, as the power stroke is effected without admitting any material quantity of air to the suction passage of the engine and without any delay in the application of the brake mechanisms, and pressures on opposite faces of the piston may be almost instantly equalized to permit a substantially instantaneous release of the brake mechanisms, and to quickly return the actuator piston and brake mechanisms to the off position, without danger of stalling the engine if idling, or materially interfering with its operation during the return movement of the actuator piston.

Obviously the actuator cylinder and the reservoir could be formed separately, if desired, in which case the suction pipe could be connected both to the reservoir and to the actuator cylinder forward of the piston, and we have shown such a construction in Fig. 5, in which the parts corresponding with those in Figs. 1 and 2 are given the same reference numerals with the addition of 200. In this instance the reservoir cylinder, 230, is separated from the actuator cylinder, 201, by the partition, or head, 202, as in Fig. 2, and the suction pipe, 226, is connected to both cylinders on opposite sides of the partition. The construction and operation of the device shown in Fig. 5 is otherwise substantially the same as that previously described with reference to Figs. 3 and 4, as the opening of the suction valve after a power stroke of the piston will connect the actuator cylinder in rear of the piston with the reservoir, indicated at R², and also with the actuator cylinder forward of the piston to produce an equalization of pressures and permit the immediate release of the brake mechanism, as before described.

It will be understood that in the construction shown in Figs. 3 and 4 and in Fig. 5, the valve mechanism will be preferably constructed as previously described, so that the operator can, by taking up the lost motion between the valve casing and the valve actuating sleeve, apply his physical force to the brake mechanism or other part to be operated by the power actuator in addition to the power of the actuator, or to operate said part on failure of power or when the engine is not in operation.

It will be understood that while we have shown all of the pipes and connections illustrated in the drawings of substantially the same diameter, that the suction pipe connecting the actuator cylinder with the suction passage of the engine, which is of considerable length may provide sufficient skin friction to restrict the passage of air therethrough sufficiently to prevent stalling the engine, if idling, but obviously the flow of air into the intake manifold may be restricted by other means, as reducing valves or nipples in a well known way, and by way of example we have illustrated in Fig. 3, an adjustable restricting valve, 128, in the suction pipe between the check valve, 127, and the manifold, which may, if desired, be employed for this purpose.

As previously stated, it would be possible to carry our invention into effect by the employment of a variable volume reservoir, in the form of a collapsible tube, or receptacle, and in Fig. 6, for example, we have shown a collapsible tube, 330, having sufficient resiliency to resume its normal condition and interposed between the suction pipe, 326, and the pipe, 326ª, leading to the suction end of the valve mechanism, in the same manner as the reservoir, R, is connected in Fig. 2. Dotted lines in Fig. 6 indicate the position of the walls of the collapsible tube, 330, when exposed to suction on the exterior.

In Fig. 7 we have shown interposed between the suction pipe, indicated at 426, and the pipe, indicated at 426ª, leading to the suction end of the valve mechanism, as in Fig. 2, a collapsible receptacle of well known type which may be provided with a spring, 436, to assist in restoring it to the enlarged condition. We prefer, however, to employ a variable volume reservoir comprising a cylinder and piston, as previously described.

What we claim and desire to secure by Letters Patent is:—

1. The combination with an internal combustion engine provided with a throttle controlled suction passage from the carburetor to the engine cylinders, a power actuator comprising relatively movable parts, at least one of which is provided with means for connecting it with a part to be operated, controlling valve mechanism for the actuator, and means for connecting the power actuator between relatively movable parts thereof with the suction passage of the engine between the throttle valve and the engine cylinders, and with a source of higher pressure fluid under the control of said valve mechanism, of a variable volume vacuum reservoir communicating with said connecting means and connected at all times with the suction passage, and being held by suction in its position of substantially minimum capacity when the engine is running, and constructed to expand to increased capacity when higher pressure fluid is withdrawn therethrough from the actuator, to temporarily accommodate quantities of said higher pressure fluid so withdrawn, to insure rapidity of operation of the actuator and prevent material interference with the operation of the engine, or stalling it if idling.

2. The combination with an internal combustion engine provided with a throttle controlled suction passage from the carburetor to the engine cylinders, a power actuator comprising a cylinder and a piston therein, at least one of said parts being provided with means for connecting it with a part to be actuated, controlling valve mechanism for the actuator connected to said cylinder between the piston and a closed end of the cylinder, tubular connections from said valve mechanism to said suction passage between the throttle valve and the engine cylinders, and means for connecting said valve mechanism with a source of higher fluid pressure, of a variable volume reservoir, connected with said tubular connection and communicating at all times with the suction passage of the engine, and held yieldingly by suction in its position of substantially minimum capacity when the engine is running, and constructed to expand to increased capacity when higher pressure fluid is withdrawn therethrough from the actuator cylinder, to temporarily accommodate quantities of said higher pressure fluid so withdrawn, to insure rapidity of operation of the actuator and prevent material interference with the operation of the engine, or stalling it if idling.

3. The combination with an internal combustion engine provided with a throttle controlled suction passage from the carburetor to the engine cylinders, a power actuator comprising relatively movable parts, at least one of which is provided with means for connecting it with a part to be operated, controlling valve mechanism connected with the actuator between relatively movable parts thereof, a tubular connection from the valve mechanism to the suction passage of the engine between the throttle valve and the engine cylinders, and means for connecting said valve mechanism with a source of higher fluid pressure, of a variable volume vacuum reservoir communicating with said tubular connection and connected at all times with the suction passage, said reservoir being provided with a movable wall portion having its outer face exposed at all times to the higher fluid pressure, said wall portion being held by the suction of the engine in position to maintain the capacity of the reservoir substantially at minimum when the engine is running, and constructed to move in a direction to increase the capacity of the reservoir when higher pressure fluid is withdrawn therethrough from the actuator, to temporarily accommodate quantities of said higher pressure fluid so withdrawn, to insure rapidity of operation of the actuator and prevent material interference with the operation of the engine or stalling it if idling.

4. The combination with an internal combustion engine provided with a throttle controlled suction passage from the carburetor to the engine cylinders, a power actuator comprising a cylinder and piston, at least one of said parts being provided with means for connecting it with a part to be operated, controlling valve mechanism for the actuator connected therewith between the piston and the closed end of the cylinder, a tubular connection from said valve mechanism to the suction passage between the throttle valve and the engine cylinders, and means for connecting the valve mechanism with the atmosphere, of a variable volume vacuum reservoir communicating with said tubular connection and connected at all times with the suction passage, said reservoir being provided with a movable wall having its exterior face subjected to atmospheric pressure and its inner face to the suction of the engine, and being held thereby when the engine is running, in position to maintain said reservoir at substantially its minimum capacity, said wall being subjected to yielding pressure in a direction to enlarge the capacity of the reservoir when air is withdrawn therethrough from the actuator cylinder, to temporarily accommodate quantities of said air to insure rapidity of operation of the actuator and prevent material interference with the operation of the engine, or stalling it if idling.

5. The combination with an internal combustion engine provided with a throttle controlled suction passage from the carburetor to the engine cylinders, a power actuator comprising a cylinder and piston, at least one of said parts being provided with means for connecting it with a part to be operated, controlling valve mechanism for the actuator connected therewith between the piston and a closed end of the cylinder, a tubular connection from said valve mechanism to the suction passage between the throttle valve and the engine cylinders, and means for connecting the valve mechanism with the atmosphere, of a variable volume vacuum reservoir communicating with said tubular connection and connected at all times with the suction passage, said reservoir being provided with a movable wall having portions in sealing engagement with the reservoir, the outer face of said wall being subjected to atmospheric pressure and the inner face being subjected to suction, holding said wall in position when the engine is running to maintain the reservoir at substantially its minimum capacity, and a spring connected with said movable wall, whereby said reservoir will expand to increased capacity when air is withdrawn therethrough from the actuator, to temporarily accommodate quantities of said air to insure rapidity of operation of the actuator and prevent material interference with the operation of the engine, or stalling it if idling.

6. The combination with an internal combustion engine provided with a throttle controlled suction passage from the carburetor to the engine cylinders, a power actuator comprising a cylinder and piston, at least one of said parts being provided with means for connecting it with a part to be operated, controlling valve mechanism for the actuator connected therewith between the piston and the closed end of the cylinder, a tubular connection from said valve mechanism to the suction passage between the throttle valve and the engine cylinders, and means for connecting the valve mechanism with the atmosphere, of a variable volume vacuum reservoir communicating with said tubular connection and connected at all times with the suction passage, said reservoir comprising a cylindrical portion, a piston movable therein, having its outer face exposed to atmospheric pressure, and its inner face exposed to the suction of the engine, and being held by suction when the engine is running in position to maintain the reservoir at substantially its minimum capacity, and a spring connected with said piston for moving it in a direction to increase the capacity of the reservoir when air is withdrawn therethrough from the actuator, to temporarily accommodate quantities of said air to insure rapidity of operation of the actuator and to prevent material interference with the operation of the engine, or stalling it if idling.

7. In a brake system for automotive vehicles provided with an internal combustion engine for propelling the same, having a throttle controlled suction passage from the carburetor to the engine cylinders, a power actuator comprising relatively movable parts, brake mechanisms, connections between at least one of the movable parts of the actuator and said brake mechanisms, controlling valve mechanism for the actuator, means for connecting the actuator between relatively movable parts thereof with the suction passage of the engine between the throttle valve and the engine cylinders, and with a source of higher pressure fluid under the control of said valve mechanism, of a variable volume vacuum reservoir communicating at all times with said connecting means between the valve mechanism and the suction passage, and being held by suction in position to maintain it at substantially minimum capacity when the engine is running and constructed to expand to increased capacity when higher pressure fluid is withdrawn therethrough from the actuator, for temporarily accommodating quantities of said higher pressure fluid, to insure rapidity of operation of the actuator and prevent interference with the operation of the engine, or stalling it if idling.

8. In a brake system for automotive vehicles provided with an internal combustion engine for propelling the same, having a throttle controlled suction passage from the carburetor to the engine cylinders, a power actuator comprising a cylinder and a piston therein, brake mechanisms and means for connecting at least one of said parts of the actuator with said brake mechanisms, controlling valve mechanism for the actuator connected to said cylinder between the piston and a closed end of the cylinder, tubular connections from said valve mechanism to the suction passage between the throttle valve and the engine cylinders, and means for connecting said valve mechanism with a source of higher fluid pressure, of a variable volume reservoir connected with said tubular connection and communicating at all times with the said suction passage, and held yieldingly by suction in position to maintain said reservoir at substantially minimum capacity when the engine is running, and constructed to expand to increased capacity when higher pressure fluid is withdrawn from the actuator cylinder for temporarily accommodating quantities of said higher pressure fluid, to insure rapidity of operation of the actuator and prevent material interference with the operation of the engine, or stalling it if idling.

9. In a brake system for automotive vehicles provided with an internal combustion engine for propelling the same, having a throttle controlled suction passage from the carburetor to the engine cylinders, a power actuator comprising a cylinder and a piston therein, brake mechanisms and means for connecting at least one of said parts of the actuator with said brake mechanisms, controlling valve mechanism for the actuator connected to said cylinder between the piston and a closed end of the cylinder, tubular connections from said valve mechanism to the suction passage between the throttle valve and the engine cylinders, and means for connecting said valve mechanism with a source of higher fluid pressure, of a variable volume reservoir connected with said tubular connection and communicating at all times with the said suction passage, said reservoir having a movable wall portion exposed on its outer face to the higher fluid pressure, and on its inner face to the suction of the engine, and yieldingly held by suction in position to maintain said reservoir at substantially its minimum capacity, when the engine is running, and constructed to move into position to increase the capacity of the reservoir when higher pressure fluid is withdrawn therethrough from the actuator cylinder, to temporarily accommodate quantities of said higher pressure fluid, to insure rapidity of operation of the actuator and prevent material interference with the operation of the engine, or stalling it if idling.

10. In a brake system for automotive vehicles provided with an internal combustion engine for propelling the same, having a throttle controlled suction passage from the carburetor to the engine cylinders, a power actuator comprising a cylinder and a piston therein, brake mechanisms and means for connecting at least one of said parts of the actuator with said brake mechanisms, controlling valve mechanism for the actuator connected to said cylinder between the piston and a closed end of the cylinder, tubular connections from said valve mechanism to the suction passage between the throttle valve and the engine cylinders, and means for connecting said valve mechanism with a source of higher fluid pressure, of a variable volume reservoir connected with said tubular connections and communicating at all times with the said suction passage, said reservoir being provided with a movable wall having portions in sealing engagement with the reservoir, said wall being exposed on its outer face to the higher fluid pressure and on its inner face to the suction of the engine, and being held by suction in position to maintain the reservoir at substantially minimum capacity when the engine is running, yielding means acting on said wall in a direction to increase the capacity of said reservoir when higher pressure fluid is withdrawn from the actuator cylinder for temporarily accommodating quantities of said higher pressure fluid, to insure rapidity of operation of the actuator and prevent material interference with the operation of the engine, or stalling it if idling.

11. In a brake system for automotive vehicles provided with an internal combustion engine for propelling the same, having a throttle controlled suction passage from the carburetor to the engine cylinders, a power actuator comprising a cylinder and a piston therein, brake mechanisms and means for connecting at least one of said parts of the actuator with said brake mechanisms, controlling valve mechanism for the actuator connected to said cylinder between the piston and a closed end of the cylinder, tubular connections from said valve mechanism to the suction passage between the throttle valve and the engine cylinders, and means for connecting said valve mechanism with a source of higher fluid pressure, of a variable volume reservoir connected with said tubular connections and communicating at all times with the said suction passage, said reservoir comprising a cylinder and a piston therein, having its outer face subjected to the higher pressure fluid and its inner face subjected to the suction of the engine, said piston being held by suction in position to maintain said reservoir at its substantially minimum capacity when the engine is running, and being moved in a direction to expand the capacity of the reservoir when higher pressure fluid is withdrawn therethrough from the actuator cylinder, to temporarily accommodate quantities of said higher pressure fluid so withdrawn, to insure rapidity of operation of the actuator and prevent material interference with the operation of the engine, or stalling it if idling.

12. In a brake system for automotive vehicles provided with an internal combustion engine, having a throttle controlled suction passage from the carburetor to the engine cylinders, a power actuator comprising a cylinder and a piston therein, brake mechanisms and means for connecting them with at least one of the parts of the actuator, controlling valve mechanism for the actuator, connected with said cylinder between the piston and a closed end of the cylinder, tubular connections from said valve mechanism to said suction passage between the throttle valve and the engine cylinders, and means for connecting said valve mechanism with the atmosphere, of a variable volume reservoir connected with said tubular connection and communicating at all times with the suction passage of the engine, said reservoir comprising a cylinder, a piston therein, having its outer face exposed to atmospheric pressure, and its inner face exposed to the suction of the engine, and a spring connected with said piston for moving it in a direction contrary to atmospheric pressure thereon, said piston being held yieldingly by suction in position to maintain the reservoir at its substantially minimum capacity when the engine is running, and being adapted to move in a direction to increase the capacity of the reservoir when air is withdrawn from the actuator cylinder for temporarily accommodating quantities of said air, to insure rapidity of operation of the actuator and prevent material interference with the operation of the engine, or stalling it if idling.

13. The combination with an internal combustion engine provided with a throttle controlled suction passage from the carburetor to the engine cylinders, of a power actuator comprising a cylinder closed at both ends and a piston movable therein, at least one of said parts being provided with means for connecting it with a part to be operated, controlling valve mechanism for the actuator connected with the cylinder in rear of the piston, a tubular connection from said valve mechanism to said suction passage between the throttle valve and the engine cylinders, means for connecting the valve mechanism with a source of higher fluid pressure, the portion of said actuator cylinder forward of the piston being connected at all times with said suction passage, of a variable volume vacuum reservoir communicating at all times with said tubular connection and with the actuator cylinder forward of the piston, and being held by suction in position to maintain the reservoir at substantially minimum capacity when the engine is running, and constructed to expand to increased capacity when higher pressure fluid is withdrawn therethrough from the actuator, to insure rapidity of operation of the actuator and prevent material interference with the operation of the engine, or stalling it if idling.

14. The combination with an internal combustion engine provided with a throttle controlled suction passage from the carburetor to the engine cylinders, of a power actuator comprising a cylinder closed at both ends and a piston movable therein, at least one of said parts being provided with means for connecting it with a part to be operated, controlling valve mechanism for the actuator connected with the cylinder in rear of the piston, a tubular connection from said valve mechanism to said suction passage between the throttle valve and the engine cylinders, means for connecting the valve mechanism with a source of higher fluid pressure, the portion of said actuator cylinder forward of the piston being connected at all times with said suction passage, and means for normally maintaining the valve mechanism in position to connect the actuator cylinder in rear of the piston with said suction passage when the valve mechanism is in released position, to maintain the piston of the actuator submerged in vacuum, of a variable volume vacuum reservoir communicating at all times with the suction passage and with the actuator cylinder forward of the piston, and provided with a movable wall having its outer face exposed to the higher pressure fluid and its inner face exposed to suction, and yielding means acting on said wall in a direction opposite that of the higher fluid pressure thereon, said wall being held by suction in position to maintain said reservoir at substantially minimum capacity when the engine is running, and being constructed to move to increase the capacity of the reservoir when higher pressure fluid is withdawn from the actuator in rear of the piston, to temporarily accommodate quantities of said higher pressure fluid, to insure rapidity of operation of the actuator and prevent material interference with the operation of the engine, or stalling it if idling.

15. In a brake system for automotive vehicles provided with an internal combustion engine having a throttle controlled suction passage from the carburetor to the engine cylinders, the combination with a power actutator comprising a cylinder closed at both ends and a piston movable therein, controlling valve mechanism for the actuator connected with said cylinder in rear of the piston, a tubular connection from said valve mechanism to said suction passage between the throttle valve and the engine cylinders, means for connecting said valve mechanism with the atmosphere, said actuator cylinder forward of the piston being connected at all times with the suction passage of the engine, and means for holding said valve mechanism when in released position, in position to connect the actuator cylinder in rear of the piston with said suction passage to maintain said actuator piston submerged in vacuum, brake mechanisms, connections from the actuator to said brake mechanisms, of a variable volume vacuum reservoir communicating at all times with said tubular connection and with the actuator cylinder forward of the piston thereof, said reservoir being provided with a movable wall, having its outer face exposed at all times to atmospheric pressure and its inner face exposed at all times to suction, and a spring connected with said wall and tending to move it outwardly against the atmospheric pressure thereon, said wall being held by suction in position to maintain said reservoir at substantially minimum capacity when the engine is running and moving in a direction to increase the capacity of the reservoir when pressure fluid is withdrawn therethrough from the actuator cylinder in rear of the piston to temporarily accommodate quantities of said air, to insure rapidity of operation of the actuator piston and prevent material interference with the operation of the engine, or stalling it if idling.

In testimony whereof we affix our signatures.

CALEB S. BRAGG.
VICTOR W. KLIESRATH.